June 9, 1964     G. V. CALABRESE     3,136,115
ELECTRIC CLOCK CONTROL
Filed Jan. 29, 1962
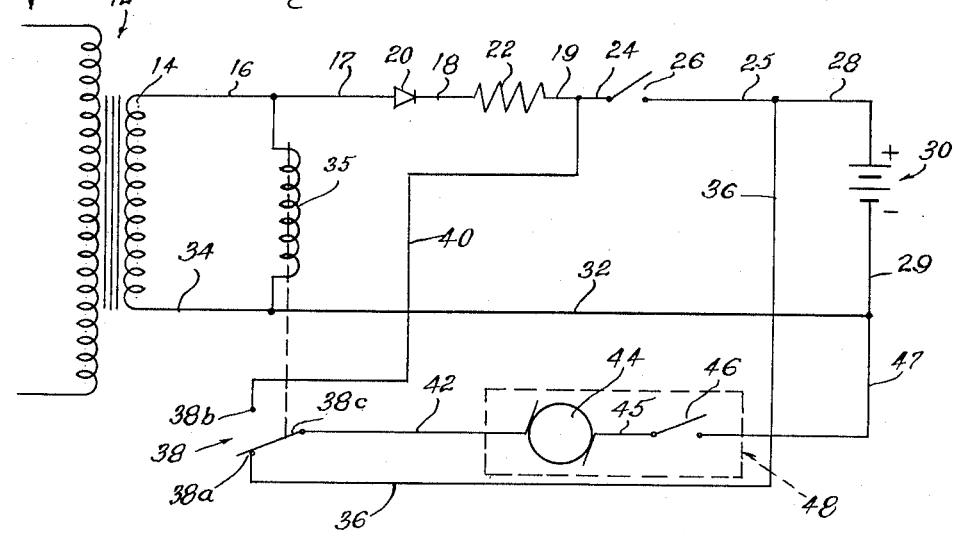
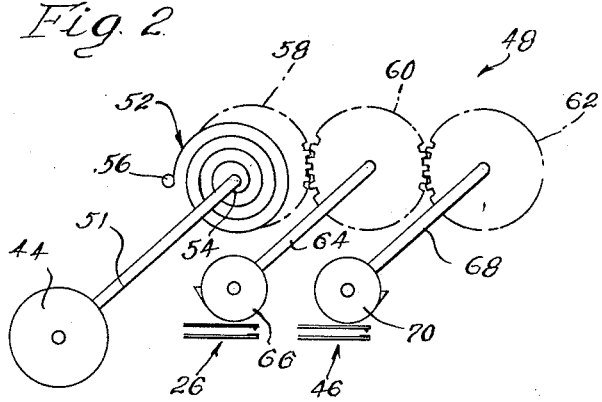
Inventor:
George V. Calabrese
By Horton, Davis, Brewer & Bergman Attys

3,136,115
ELECTRIC CLOCK CONTROL
George V. Calabrese, River Forest, Ill., assignor to Lumenite Electronic Company, Chicago, Ill., a corporation of Illinois
Filed Jan. 29, 1962, Ser. No. 169,236
1 Claim. (Cl. 58—26)

The present invention relates to an electrically operated clock.

An object of the invention is to provide an electrically operated clock that derives its driving force normally from a public electric supply, with novel means for connecting a reserve electric supply for driving the clock in the event of failure of the public supply.

A further object of the invention is to provide a novel electrically operated clock of the foregoing character in which the reserve electric supply is a storage battery and in which a circuit automatically switches to the reserve battery upon failure of the public supply, and in return to the public supply upon re-energization thereof.

A further object is to provide an electrically operated clock of the foregoing character which is spring driven but electrically wound, including novel means for automatically rewinding the spring of the clock.

Another object is to provide a clock of the foregoing general character, and novel means for automatically recharging the battery from the public electric supply.

Other objects and advantages of the invention will appear from the following detailed description taken in conjunction with the accompanying drawings, in which:

FIGURE 1 is a diagram of the circuit means utilized in the novel clock of the invention; and FIGURE 2 is a diagrammatic illustration of certain components of the clock mechanism.

Referring now in detail to the drawings, attention is first directed to FIGURE 1 showing the diagram of the circuit utilized in the clock. The usual public electric supply is indicated at 10, which may be the usual alternating current supply. A transformer 12 is included, having a secondary 14 incorporated in certain circuitry described in detail. One end of the secondary 14 is connected with a conductor 16 which leads to a conductor 17, a rectifier 20, another conductor 18 and a resistor 22. A conductor 19 leads from the resistor to a conductor 24, a recharge switch 26, then through conductors 25 and 28 to the positive side of a reserve source of electricity in the form of a storage battery 30. Leading from the opposite side of the battery is a conductor 29 which is connected with another conductor 32 which in turn is connected with a further conductor 34, the latter being connected to the opposite end of the secondary 14. A relay coil 35 is connected across conductors 16 and 34 in parallel with the secondary 14.

An additional conductor 36 is connected with the conductor 28 and to a double throw reversing switch 38, for alternatively reversing the circuitry between the main source of electricity 10 and the reserve battery 30. The conductor 36 is connected specifically to one contact 38a of the switch 38. The opposite contact 38b is incorporated in a conductor 40 which is connected with the conductor 19.

The reversing switch 38 includes a switch blade 38c connected in a conductor 42 which leads to a drive motor 44 for driving the electric clock, and in the present case for rewinding the main spring of the clock. Leading from the opposite side of the motor is a conductor 45 which leads to a rewind switch 46, and connected with the switch is a conductor 47 which in turn is connected with the conductor 32, and thus with one side of the secondary 14; it is also connected with the conductor 29 and thus with the reserve battery 30.

The dotted rectangle 48 in FIGURE 1 indicates diagrammatically the clock unit, which includes the driving motor 44 and all of the clock mechanism therein. This clock unit is indicated also diagrammatically in FIGURE 2, where the same motor 44 is also shown.

The drive motor 44 drives a drive shaft 51 for winding the main spring 52 incorporated in the clock. An inner end of the spring is connected with the drive shaft, as indicated at 54, and the outer end is connected to a pin 56 which is secured to a gear 58. The gear 58 is in mesh with another gear 60, and the latter in mesh with a third gear 62. A shaft 64 is driven by the gear 60, this shaft having a cam 66 thereon for actuating the recharge switch 26. The gear 62 is operative for driving a shaft 68, which in turn drives a cam 70 for operating the rewind switch 46, both of these switches, as will be noted, being incorporated in the circuitry of FIGURE 1. The clockwork components shown in FIGURE 2, it will be understood, represent a complete clock, and it will be further understood that the clock may be of any desired kind, these components that are actually illustrated being merely indicative. The clock in which the present invention is incorporated may be used for any of various purposes—in addition to merely indicating time, it may be utilized for control purposes, such as for controlling light switches, solenoids, valves, and in fact performing almost any kind of a control operation.

In the operation of the present invention, it may be assumed, as a starting position for purposes of description, that the A.C. source 10 is energized. In such event the secondary 14 is energized, and the coil 35 is also energized, raising the reversing switch 38 to its abnormally closed position with the switch blade 38c in engagement with the contact 38b, the switch blade normally being biased to its full line position in engagement with the contact 38a. A circuit is then established for completion through the motor 44 from the A.C. source, as follows: from the secondary 14 through the conductors 16, 17, rectifier 20, conductor 18, resistor 22, conductors 19, 40, switch 38, conductor 42, motor 44. The circuitry then continues through conductor 45, rewind switch 46, when closed as described below, then continuing through conductor 47, and in return through conductors 32 and 34 to the opposite side of the secondary 14.

In the event of failure of the main electric source 10, the secondary 14 and coil 35 become de-energized. The switch 38 then moves to its normally closed position, that shown in the drawing, with the blade 38c in engagement with the contact 38a. This then sets up a circuit from the reserve electric source 30 through the motor 44 to be completed upon closure of the rewind switch 46. This circuit is as follows: from the positive side of the battery through conductors 28, 36, switch 38, conductor 42, motor 44, conductor 45, rewind switch 46, when closed as described below, continuing through conductors 47 and 29 to the opposite side of the battery 30.

The rewind switch 46 is normally open, and is closed periodically for the purpose of rewinding the main spring 52. When this switch is closed, the motor 44 is driven, regardless of which source of electricity the driving force is derived from. The switch 46 is driven by the cam 70, as stated above, and is closed at predetermined intervals, according to the capacity of the main spring 52. The main spring is selected for the given clockwork, according to its strength, range of expansion, etc., and is rewound periodically. The rewinding, depending on the size of the clock, may be once in every seven or eight minute period, fifteen minute period, thirty minute period, or whatever interval is determined according to the various circumstances. Thus the cam 70 is of the selected size or operating characteristics, according to the speed of rotation of the gear 62 for closing the switch 46 at the desired intervals.

A similar control operation is actuated on the recharge switch 26. The battery 30, in addition to discharging due to operating the electric motor 44, discharges or loses effectiveness from inaction. Consequently, it is desired to recharge the battery periodically regardless whether the main source of electric supply is interrupted and the battery is used for driving the motor. Thus the closure of the recharge switch 26 at predetermined intervals. When the switch 26 is closed and the main electric source is energized, a circuit is set up for charging the battery as follows: from the upper end of the secondary 14 to conductors 16, 17, rectifier 20, conductor 18, resistor 22, conductors 19, 24, switch 26, conductors 25, 28 to the battery on the one side; and from the other side of the battery through conductors 29, 32 and 34 to the lower end of the secondary. As stated above, the switch 26 is closed by the cam 66, and the size of this cam or its actuating characteristics are preselected according to the speed of rotation of the cam as determined by the gear 60 for producing the desired predetermined intervals for recharging the battery. This may be done once a day, or other desired intervals.

While I have shown and described herein a certain preferred form of the invention, it will be understood that changes may be made therein within the scope of the appended claim.

I claim:

Apparatus of the character disclosed, comprising in combination, clockwork, an electric motor for winding the clockwork, a main source of electricity, a rechargeable reserve source of electricity, circuitry including a first portion which includes said sources of electricity and a recharge switch and operative, upon energization of said main source of electricity and closure of said recharge switch, for recharging said reserve source of electricity, said circuitry also including a second portion which includes said main source of electricity, said motor and a re-wind switch while excluding said recharge switch and reserve source of electricity, said circuitry further including a third portion which includes said reserve source of electricity, said motor and said re-wind switch, while excluding said recharge switch and said main source of electricity, relay means including switch means in the circuitry biased to position for closing said third portion of the circutry and opening said second portion, said relay means being operative, upon energization of said main source of electricity, for closing said second portion of the circuitry and opening said third portion, and cam means operated periodically by the clockwork for closing each said recharge switch and said re-wind switch.

References Cited in the file of this patent

UNITED STATES PATENTS

| 1,418,398 | Reid | June 6, 1922 |
| 1,912,368 | Hollinger | June 6, 1933 |

FOREIGN PATENTS

| 428,603 | Great Britain | May 16, 1935 |